July 13, 1943.   P. J. HEALY   2,324,388
SWIVELLY MOUNTED NUT
Filed Feb. 13, 1942   2 Sheets-Sheet 1

Inventor
Patrick J. Healy

J. S. Murray
Attorney

July 13, 1943.  P. J. HEALY  2,324,388
SWIVELLY MOUNTED NUT
Filed Feb. 13, 1942   2 Sheets-Sheet 2
Fig. 5
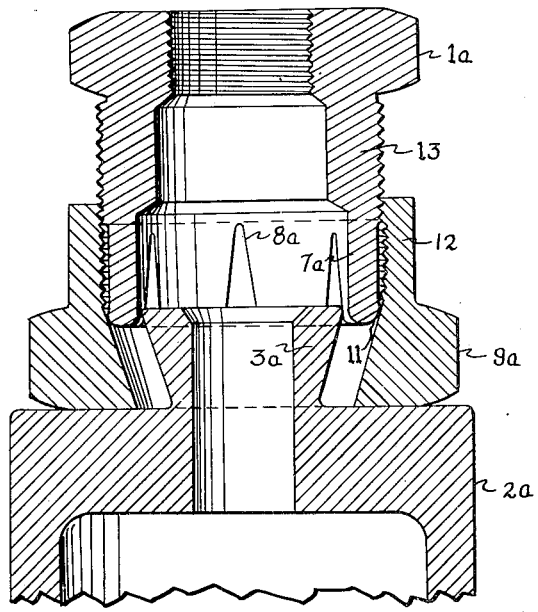
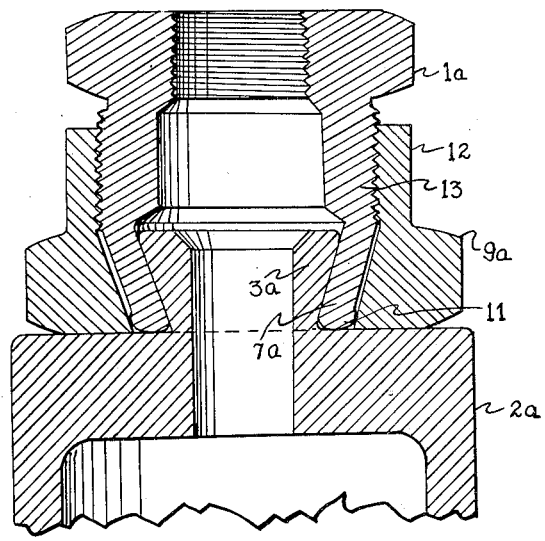
Fig. 6
Inventor
Patrick J. Healy
By
J. S. Murray
Attorney Patented July 13, 1943

2,324,388

UNITED STATES PATENT OFFICE 2,324,388

SWIVELLY MOUNTED NUT

Patrick J. Healy, Detroit, Mich.

Application February 13, 1942, Serial No. 430,751

2 Claims. (Cl. 285—97.7)

This invention relates to swivelly mounted nuts, whereby a pipe, bolt, or other threaded part may be readily coupled to a body mounting such a nut.

An object of the invention is to provide a nut with a collar, which may be slipped over a nipple or other member projecting from a body and having a relatively reduced portion adjacent to such body, said collar being divided into segments or tongues which are bendable to engage the restricted portion of the projecting member, interengaging screw threads being employed to impose the requisite bending force.

A further object is to effect bending of said collar segments, by providing the collar with a male screw thread and by progressively engaging such thread with that of a conical opening in an annulus disposed in a spaced surrounding relation to said nipple.

A further object is to swivelly and non-detachably mount a nut on an undercut nipple projecting from a body, by forming said nut with a projecting collar having an exterior screw thread adjacent to the nut and having an end portion remote from the nut divided into bendable segments, said threads being engageable with an internal thread of an annulus arranged in coaxial spaced relation to said nipple, and such annulus having a conically flared opening into which the segments are forced to effect their bending responsive to interengagement of said screw threads.

These and various other objects are attained by the construction hereinafter described and illustrated in the accompanying drawings, wherein:

Fig. 5 is an axial sectional view showing a body and a nut to be attached thereto, the nut occupying an initial position of the attaching operation and the construction being modified from that shown in preceding figures.

Fig. 6 is a view of the modified arrangement showing the assembly operation completed.

Figures 1, 2:
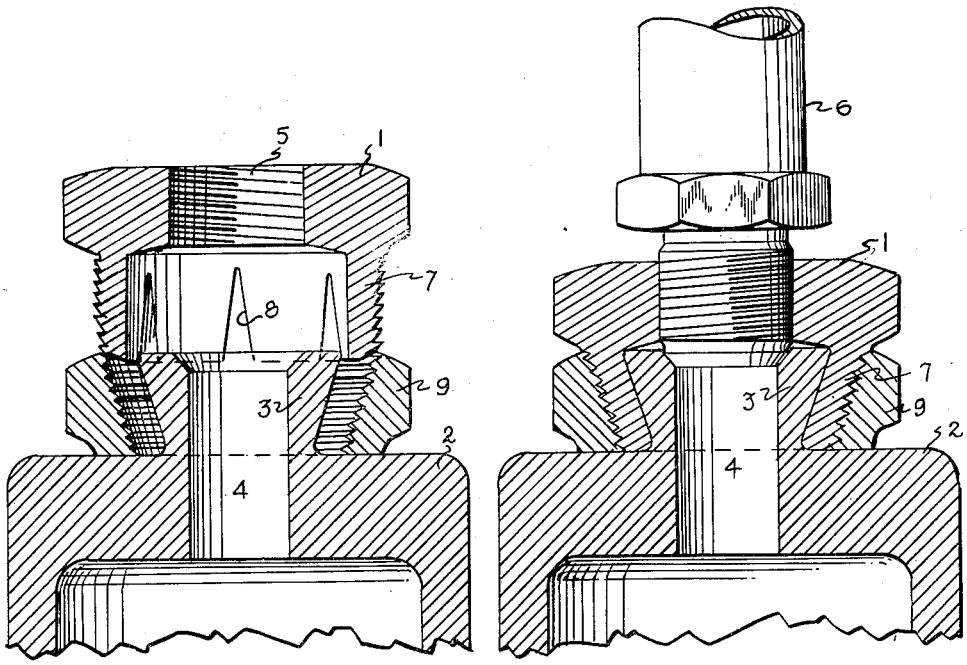
Fig. 1 is an axial sectional view of a body and a nut to be swivelly attached to such body, the nut occupying its position initial to the operation of attaching it to said body.
Fig. 2 is a similar view, showing the nut after completion of the operation of swivelly mounting it on said body.
Figures 3, 4:
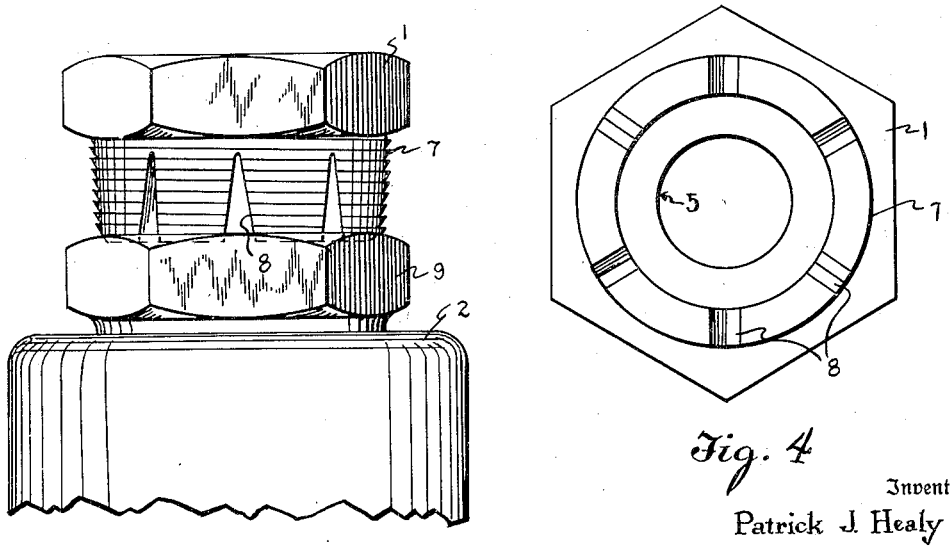
Fig. 3 is a view showing in side elevation the parts to be assembled and showing said nut substantially in its initial position.
Fig. 4 is a bottom view of the nut.

In these views, the reference character 1 designates a nut designed to be swivelly secured upon a body 2, the latter being integrally formed with a projecting nipple 3 which is exteriorly undercut in the form of an inverted conical frustrum, and which serves for swivelly mounting said nut. The body shown is hollow and has a passage 4 extending from its interior through the nipple 3, but the particular nature of said body is immaterial. The threaded central opening 5 of the nut is for the purpose of attaching a pipe 6 or other element to the body 1, as best appears in Fig. 2. Coaxial with the nut and integrally projecting from one side thereof is a collar 7 proportioned to slip over the nipple 3 and to fully enclose the latter, said collar being exteriorly threaded and being divided into a suitable number of segments by slots 8 extending from the free edge to the base of said collar. These segments are adapted to be bent toward their mutual axis as shown in Fig. 2, and when so bent fit fairly closely around the nipple 3, but without impeding rotation of the nut with respect to said nipple. Said slots progressively increase in width from the base to the free edge of the collar to afford necessary clearance between the segments to permit bending them as described. To complete the construction, there is provided an annulus 9 adapted to be slipped over the nipple 3 and to rest upon the body 2, in spaced coaxial relation to said nipple. The wall of the opening of said annulus is parallel to the inclined exterior face of the nipple and is threaded for engagement by the threads of the collar 7. The last-mentioned threads are preferably of a ratchet form, so that they may conform substantially fully to the thread of the annulus 9 when the segments of the collar are bent, as in Fig. 2. The collar 7 is of such exterior diameter that its thread may initially mesh with the initial or maximum diameter thread of the annulus 9 and the segments of the collar will be progressively bent inwardly as the nut is screwed into the annulus thus allowing the collar thread to progressively be conformed to that of the annulus. A downward pressure may be exerted upon the nut as it is rotated to assist in bending the collar segments. When the assembly operation is completed, the nut and annulus are firmly screw-threaded together, and the nut is swivelly held upon the nipple, due to the conforming relation of the collar 7 and nipple 3. The segments of the collar will offer sufficient resilient resistance to bending to assure a very tight interengagement of the threads of the collar and annulus, and thus eliminate possibility of the nut working loose due to vibration.

In the modification disclosed by Figs. 5 and 6, the body 2a and its nipple 3a conform to the preceding description. The nut 1a conforms to said description except that a relatively long collar is formed upon the nut, said collar comprising a free end portion 7a, slotted at 8a similarly to the first-described collar. The end portion 7a, however, is not threaded and is formed with a slight exterior bead 11 at its lower edge. The function of this bead is to ride with a minimum friction upon the smooth interior face of an annulus 9a similar to that first described, except as to omission of the screw thread. The annulus 9a, however, has an upstanding interiorly threaded projection 12, for engagement by an external thread formed upon an upper and relatively thick portion 13 of the collar carried by the nut 1a, the arrangement being such that the bead 11 encounters the inclined face of the annulus after an initial interengagement of the threads has been established. As interengagement of the threads progresses, the segments 7a of the collar are progressively bent inward, so that they conform substantially to the nipple 3a when the threads are fully interengaged. This modification presents the advantage that both threaded faces are cylindrical and remain cylindrical as the assembly is established. This modification also possesses the advantage that resilient resistance of the segments to their bending will act to strongly resist unscrewing of the nut, the outward thrust of the segments reacting downwardly on the annulus and upwardly on the nut.

The described construction has a particular application to aeroplane use, it being especially imperative in such use that the nut be incapable of working loose due to vibration or other disturbances.

What I claim is:

1. In a swivelly mounted nut, the combination with a body, having a projecting nipple reduced in external diameter at its inner end, of an annulus surrounding and spaced from the nipple and rotative about the nipple, and having its interior face progressively reduced in diameter toward said body, and a nut formed with a set of tongues inserted between said nipple and annulus and bent by engagement with the interior face of the annulus to substantially conform to the reduced portion of the nipple, said tongues and annulus having screw threads interengaged to effect said insertion of the tongues, whereby the annulus is fixed upon the nut and the nut is swivelly retained upon the nipple.

2. In a swivelly mounted nut, the combination with a body having a projecting nipple reduced in external diameter at its inner end, of an annulus surrounding and spaced from the nipple and rotative about the nipple and having its interior face progressively reduced in diameter toward said body, said annulus having an interiorly threaded annular extension surrounding the extended axis of the nipple, and a nut formed with a collar whereof a portion adjoining the nut is inserted in said annular extension and threaded to engage the threads of said extension, said collar having a set of tongues spaced equidistantly from the extended axis of the collar and inserted between the nipple and annulus and bent by contact with the interior face of the annulus to conform to the reduced portion of the nipple, whereby the annulus is fixed upon the nut and the nut is swivelly retained on the nipple.

PATRICK J. HEALY.